(12) United States Patent
Maciolek et al.

(10) Patent No.: US 12,438,984 B1
(45) Date of Patent: Oct. 7, 2025

(54) TELEPHONE SERVICE POWERED HOTSPOT

(71) Applicant: UIPCO, LLC, San Antonio, TX (US)

(72) Inventors: Michael J. Maciolek, Kerrville, TX (US); Donnette L. Moncrief Brown, San Antonio, TX (US); Manfred Amann, San Antonio, TX (US); Snehal Desai, Richardson, TX (US); Nicole Ferretti, Plano, TX (US); Chung Shing Sheldon Lee, South Jordan, UT (US); Martin Lopez, Frisco, TX (US); Kelsey Anne O'Brien, Austin, TX (US); Melissa Jane Porter, Lutz, FL (US); Sayeef Rahim, Allen, TX (US); Eric David Schroeder, San Antonio, TX (US); Steven J. Schroeder, Oak Point, TX (US); Joseph Michael Vesco, Sparks, NV (US)

(73) Assignee: United Services Automobile Association (USAA), San Antonio, TX (US)

( * ) Notice: Subject to any disclaimer, the term of this patent is extended or adjusted under 35 U.S.C. 154(b) by 238 days.

(21) Appl. No.: 18/324,267

(22) Filed: May 26, 2023

Related U.S. Application Data

(60) Provisional application No. 63/365,435, filed on May 27, 2022.

(51) Int. Cl.
*H04M 5/02* (2006.01)
*H04L 12/28* (2006.01)

(52) U.S. Cl.
CPC .......... *H04M 5/02* (2013.01); *H04L 12/2858* (2013.01)

(58) Field of Classification Search
CPC ...... H04M 5/02; H04M 1/725; H04M 1/2535; H04M 11/062; H04M 11/06; H04M 1/72445; H04M 11/066; H04M 2207/18; H04M 3/304; H04M 3/30; H04L 12/2858
See application file for complete search history.

(56) References Cited

U.S. PATENT DOCUMENTS

| 8,488,593 | B2 * | 7/2013 | Chan | H04M 11/007 370/352 |
| 9,331,888 | B1 * | 5/2016 | Conway | H04L 65/1069 |
| 9,420,110 | B2 * | 8/2016 | Yukie | H04L 12/66 |

(Continued)

*Primary Examiner* — Akelaw Teshale
(74) *Attorney, Agent, or Firm* — Plumsea Law Group, LLC

(57) ABSTRACT

A communication device is disclosed. Specifically, the communication device may be a telephone service powered hotspot that plugs into a telephone jack of a Public Switched Telephone Network. The telephone plug of the hotspot provides power and a telephone connection for the hotspot. The hotspot may include a modem that can use the telephone connection to connect the hotspot to an Internet Service Provider. By using such a connection, the modem can provide dial-up internet connectivity for the hotspot. The hotspot can use the power supply to provide a wired or wireless power source for nearby devices after a disaster disables usual power sources. The hotspot can use the internet access from the modem to provide wired or wireless internet access for the nearby devices. However, because dial-up connectivity can have a very limited bandwidth, the hotspot may throttle applications when the bandwidth requires such throttling.

20 Claims, 7 Drawing Sheets

(56) References Cited

U.S. PATENT DOCUMENTS

| | | | | |
|---|---|---|---|---|
| 10,462,074 | B2* | 10/2019 | Emmanuel | H04M 11/00 |
| 2011/0299418 | A1* | 12/2011 | Wang | G06Q 50/06 |
| | | | | 370/252 |
| 2015/0003595 | A1* | 1/2015 | Yaghi | H04M 3/5175 |
| | | | | 379/85 |
| 2015/0381591 | A1* | 12/2015 | Best | H04L 9/00 |
| | | | | 455/427 |
| 2017/0054657 | A1* | 2/2017 | Emmanuel | H04L 1/1671 |
| 2019/0306323 | A1* | 10/2019 | Rodriguez | H04M 1/738 |
| 2020/0221400 | A1* | 7/2020 | Gorsica | H04W 4/80 |

* cited by examiner

TELEPHONE SERVICE POWERED HOTSPOT

CROSS-REFERENCE TO RELATED APPLICATIONS

This application claims the benefit of U.S. Provisional Patent Application Ser. No. 63/365,435 filed on May 27, 2022 and titled "Telephone Service Powered Hotspot." The disclosure of which is incorporated by reference in its entirety.

TECHNICAL FIELD

The present disclosure generally relates to a communication device. The present disclosure relates in particular to telephone service powered hotspot that provides communication and power capabilities in an emergency.

BACKGROUND

Many device rely on network connectivity and a power supply to operate when providing access to the Internet. However, a disaster may cause there to be limits to access to one or both of these resources. For example, a cut wire or a damaged hotspot may interfere with internet access and a connection or access point may not function properly subsequently. However, after a disaster, there may be even more demand for internet connectivity and for a power supply. Even if high-bandwidth applications such as video streaming cannot run, it would be helpful to be able to send small amounts of data over the Internet, such as instant messages or e-mails requesting aid, or allow use of a textual Web browser. Even after other infrastructure may be damaged, a standard telephone network may still be likely to work because the telephone network was built to be a resilient resource. However, existing devices and techniques may not be able to readily utilize the residual telephone network as a replacement for the damaged infrastructure.

There is a need in the art for a system and method that addresses the shortcomings discussed above.

SUMMARY

In one aspect, the present disclosure is directed to a communication device. The communication device includes a modem configured to provide a dial-up internet connection. The communication device also includes a telephone plug configured to connect the communication device to a telephone jack of a telephone network. The telephone plug includes at least one electrical contact configured to receive electrical power from the telephone network. The telephone plug includes at least one electrical contact configured to connect the modem to the telephone network. The modem connects to the telephone network and provides an internet connection by using the telephone network as a source of dial-up internet access. The communication device also includes a wireless networking module configured to provide wireless internet access to an area near the communication device using the internet connection.

In one aspect, the present disclosure is directed to a communication device. The communication device includes a modem configured to provide a dial-up internet connection. The communication device also includes a telephone plug configured to connect the communication device to a telephone jack of a telephone network. The telephone plug includes at least one electrical contact configured to receive electrical power from the telephone network. The telephone plug includes at least one electrical contact configured to connect the modem to the telephone network. The modem connects to the telephone network and provides an internet connection by using the telephone network as a source of dial-up internet access. The communication device also includes a wireless networking module configured to provide wireless internet access to an area near the communication device using the internet connection. The communication device also includes a power supply configured to receive the electrical power from the telephone network through the telephone plug. The communication device also includes a port configured to send the electrical power from the power supply to a connected device.

In one aspect, the present disclosure is directed to a communication device. The communication device includes a modem configured to provide a dial-up internet connection. The communication device also includes a telephone plug configured to connect the communication device to a telephone jack of a telephone network. The telephone plug includes at least one electrical contact configured to receive electrical power from the telephone network. The telephone plug includes at least one electrical contact configured to connect the modem to the telephone network. The modem connects to the telephone network and provides an internet connection by using the telephone network as a source of dial-up internet access. The communication device also includes a wireless networking module configured to provide wireless internet access to applications executed on user devices near the communication device using the internet connection. The communication device also includes a throttling module configured to allocate bandwidth for the internet connection to the applications using the internet connection.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
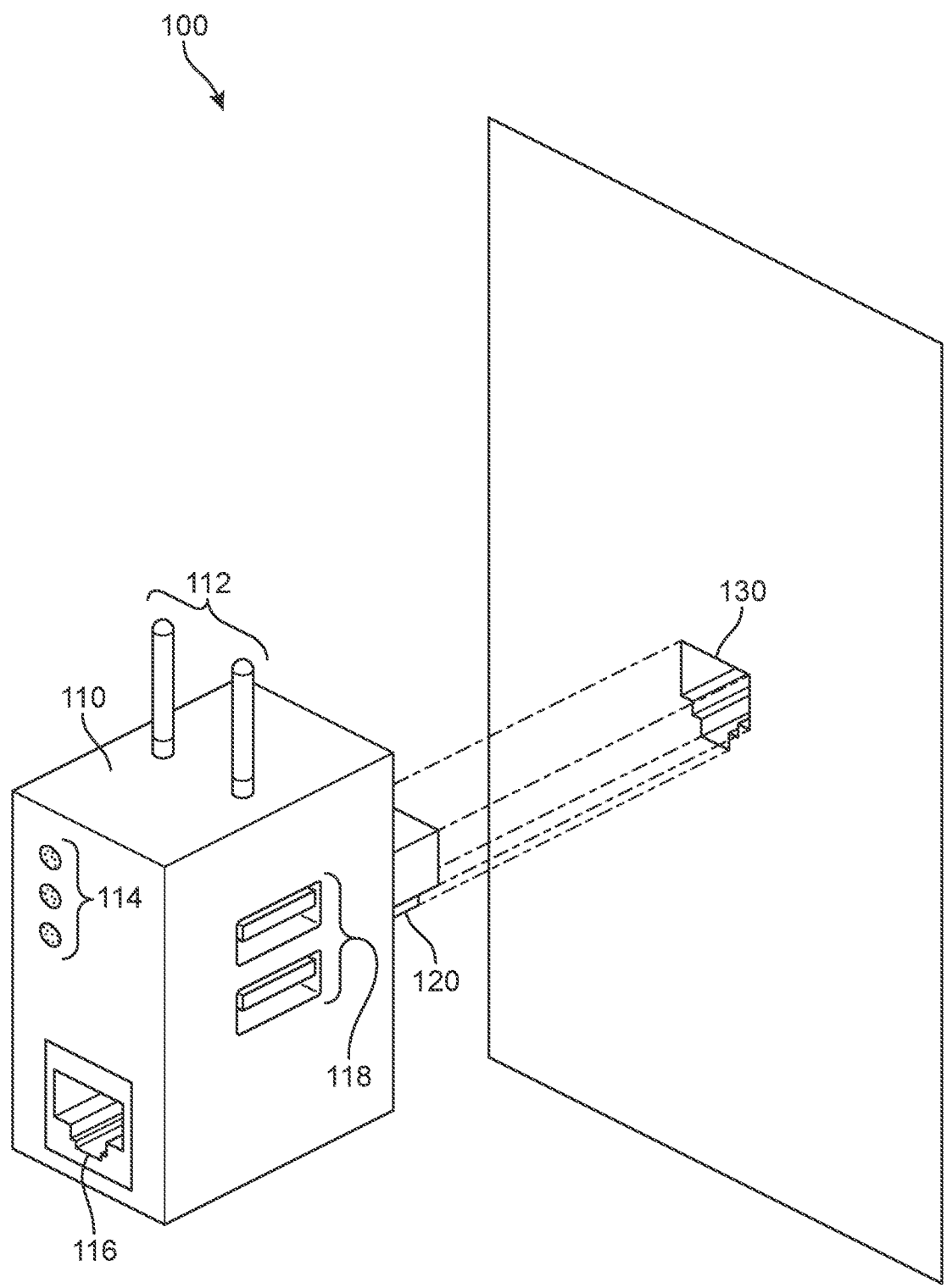
FIG. 1 is a schematic view of telephone service powered hotspot that is to be introduced into a telephone network wall plate, according to an embodiment.

The embodiments provide telephone service powered hotspots and methods for their use. Specifically, the embodiments provide devices and related methods that connect to a telephone service such as through a telephone jack and use the telephone service to provide internet connectivity through use of a dial-up modem. The device may also be powered by the telephone service through the telephone jack.

As used herein, the term "telephone network" refers to a telecommunications network that connects telephones which allows telephone calls between two or more parties, as well as newer features such as fax and internet. Various types of telephone network exist, such as a landline network, a wireless network, a private network, and an Integrated Service Digital Network (ISDN). The disclosure focuses on a landline network for several reasons. First, the landline network includes telephone jacks, described further below, that include wires with the ability to transmit data (if used with an appropriate modem) as well as power. Such a telephone jack may be suitable as an interface between the telephone network and the telephone service powered hotspot. A particular telephone network that may be suitable for use in the context of embodiments may be the public switched telephone network (PSTN).

The PSTN provides an infrastructure that provides telecommunication services for the public. The PSTN includes the overall network formed by the global circuit-switched telephone networks that may be operated by telephony operators of various sizes and geographic reach. The network includes connections such as telephone lines, fiber optic links, undersea cables, and various wireless links such as cellular, microwave, and satellite communication. These connections send information between switching centers that allow the networks that may be a part of the PSTN to communicate with each other. While the PSTN was originally formed of fixed-line analog telephone systems, the PSTN now has a digital core network and includes other networks as well as fixed (land-line) telephones. For the purposes of this disclosure, the telephone service powered hotspot accesses the PSTN through a wall phone jack, which will be discussed in greater detail, below.

As used herein, a "phone jack" refers to a type of modular connector that allows access to a PSTN, as discussed above, by an electronic device. A modular connector may be a type of electrical connector used for cords and cables of electronic devices and appliances. In the U.S., the Federal Communications Commission (FCC) mandated an interface registration system, and modular connectors used in applications such as telephone and Ethernet may be referred to as "registered jacks." Other standards may be used in other countries.

A telephone jack and a telephone plug may be electrical connectors for connecting a telecommunications device to the telephone wiring inside a building, connecting it to a telephone network. The plug may be inserted into its counterpart jack. Usually, the jack may be part of a wall, and the wiring associated with the telephone network may be hidden behind the wall. While telephone jacks and plugs vary from country to country, a common plug style may be the 6P2C style. Here, 6P2C means six positions, two contacts on the plug.

A connection standard, such as RJ11, specifies not only the physical aspects of an electrical connector, such as the shape of the jack and the corresponding shape of the plug, but also the signal definitions and the assignment or function of each contact. For example, the RJ11 standard specifies a standard for an 6P2C connector used with a single telephone line. However, related standard RJ14 provides a standard for a 6P4C connector used with two telephone lines and related standard RJ25 provides a standard for a 6P6C connector used with three telephone lines. All of these registered jacks use the same six-position modular connect, and thus may be physically the same except for having different numbers of contacts (two, four, or six) allowing connections for one, two, or three telephone lines respectively.

The embodiments provide a device that can connect, using a plug with the jack of a telephone system. Because telephone systems can provide power along with the ability to transmit data (modulated into an analog phone signal), the device can provide connectivity to users. Ports such as Ethernet or Universal Serial Bus (USB) ports integrated into the device may also provide power to charge cellular telephones or other devices. The device can be waterproof and shockproof. In addition, the device can have a protocol that limits or blocks data transfers that use too much bandwidth (like videos), as the internet connection will generally be fairly slow.

FIG. 1 is a schematic view of telephone service powered hotspot that is to be introduced into a telephone network wall plate, according to an embodiment. FIG. 1 shows a schematic view 100 of a telephone service powered hotspot 110, subsequently referred to as hotspot 110. Hotspot 110 includes a telephone plug 120 that protrudes from one side of the hotspot 110. Hotspot 110 is shown as a boxlike structure with certain indentations and protrusions. However, in other embodiments, hotspot 110 may take on other shapes, such as a rounded shape, as desired by a user.

Telephone plug 120 is shown as a standard 6P2C connector, such as an RJ11 plug. However, it may be recognized that other plugs may use other possible versions of the telephone plug. For example, telephone plug 120 may include different numbers of positions and different numbers of contacts. For example, other modular connectors include a 4P4C connector, an 8P8C connector (such as that used in Ethernet networks), and a 10P10C connector. Other types of modular connectors may be used in foreign countries, and the telephone plug 120 may be adapted appropriately to attach the hotspot 110 to telephone jack 130. As discussed further below, telephone plug 120 securely engages with telephone jack 130.

The telephone plug 120 may include a latching tab. Most modular connectors may be designed with a latching mechanism that secures the physical connection. As the telephone plug 120 may be inserted into a telephone jack 130, a plastic tab on the plug locks against a ridge in the socket so that the telephone plug 120 cannot be removed without disengaging the tab by pressing it against the plug body. The standard orientation for installing a telephone jack 130 and corresponding telephone plug 120 in a vertical surface may be with the tab down. However, it may also be possible to change the orientation of the telephone plug 120 and the telephone jack 130 in other examples, if desired.

Hotspot 110 may be shown in FIG. 1 as including other elements on its exterior. Internal elements of hotspot 110 may be provided and discussed in greater detail in FIG. 4.

For example, hotspot 110 includes antennas 112. These antennas 112 allow hotspot 110 to provide wireless internet access to devices in its vicinity. While such internet access will generally be provided using some variant of Wi-Fi, hotspot 110 may also be able to communicate with devices in its vicinity using other wireless communication technologies such as Bluetooth or ZigBee, Near-Field Communication (NFC), or cellular communications. While hotspot 110 may be shown using two antennas 112, it may be possible to use a single antenna 112 or three or more antennas 112, or to embed the antennas 112 in the interior of hotspot 110 in other embodiments. In addition to communications, the antennas 112 may be involved in providing wireless power through a magnetic field.

FIG. 1 also shows that hotspot 110 includes three indicators 114. For example, these indicators 114 may be Light-Emitting Diodes (LEDs) or other light-up indicators that provide information about the operation of hotspot 110 based on whether or not they may be lit up. Additional information may be provided based on the color of indicators 114, or if they flash in various ways. While FIG. 1 shows the presence of three indicators 114, there may be fewer indicators (or no indicators) or more indicators. The indicators may each have a single color when lit, such as red, green, or blue, or may be able to take on different colors. For example, one indicator may indicate that the hotspot 110 may be powered on, one indicator may indicate that the hotspot 110 may be actively connected to the Internet, and one indicator may flash on and off or change color as data may be actively transmitted. However, indicators 114 may be replaced by other elements indicating the operation of the hotspot 110, such as a digital display of various sorts.

Hotspot 110 may also include ports for allowing wired connections by devices to the hotspot 110 so that the hotspot 110 acts as a source of wired power and wired internet connectivity. For example, Ethernet port 116 allows hotspot 110 to provide wired internet connectivity. As shown in FIG. 1, Ethernet port 116 may be placed on the bottom of hotspot 110. However, in other embodiments, the Ethernet port 116 may be placed on another portion of hotspot 110, or may be omitted entirely. As will be discussed further, below, the Ethernet port 116 allows other devices in the vicinity of the hotspot to form a wired internet connection using the internet connectivity provided by the hotspot 110. Ethernet port 116 may also convey power.

Hotspot 110 may also include serial ports, such as serial ports 118. Serial ports 118 may be shown as a pair of Universal Serial Bus (USB) connectors, specifically USB Type-A connectors. However, it will be recognized that other types of USB connectors may be used as serial ports 118, such as USB Type-C connectors. Additionally, other types of serial ports 118 such as Thunderbolt ports may also be used in other embodiments. The serial ports 118 may provide electrical power to devices connected to the hotspot 110. Additionally, the serial ports 118 may transmit data, serving as an alternative connection to the Ethernet port 116 that allows a connected device to draw both power and internet connectivity from the telephone jack 130 through telephone plug 120.

Figure 2:
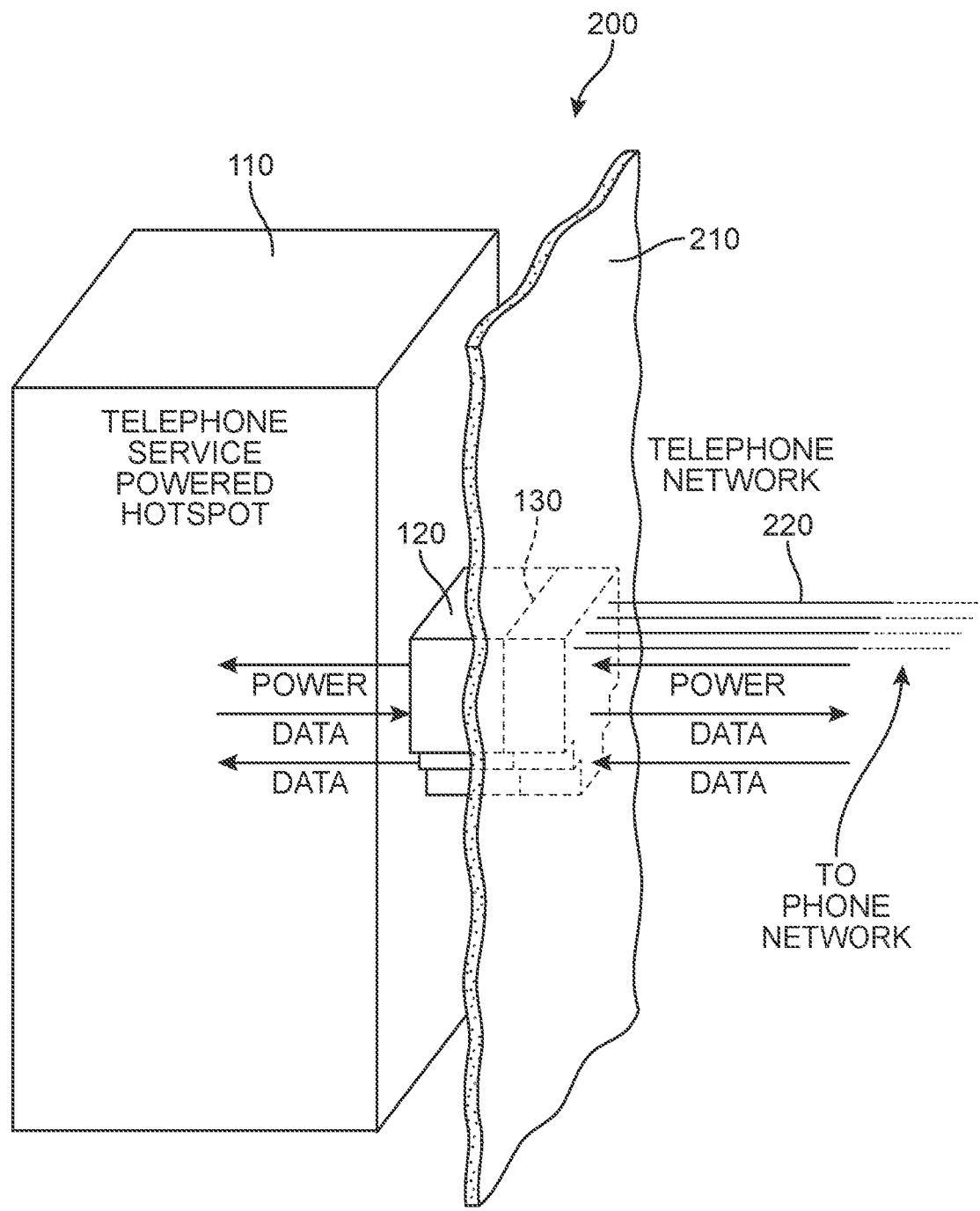
FIG. 2 is a schematic view of interaction between the telephone service powered hotspot and a telephone network, according to an embodiment.

FIG. 2 is a schematic view of interaction between the telephone service powered hotspot and a telephone network, according to an embodiment. FIG. 2 presents a schematic view 200 including telephone service powered hotspot 110 (subsequently hotspot 110) and telephone network 210. Hotspot 110 includes a telephone plug 120, which may take on a standard form such as an RJ11 plug, as discussed above. Such a telephone plug 120 may be introduced into telephone jack 130. As discussed above, a plastic tab that may be part of telephone plug 120 may then secure telephone plug 120 in telephone jack 130. Once telephone plug 120 may be introduced into telephone jack 130, it connects to telephone network 210 using connector wires 220.

FIG. 2 shows four connector wires 220, which would correspond to an RJ14 connector. However, there may be only two connector wires 220, which would correspond to the RJ11 connector. However, in other embodiments, connector wires 220 may include two connector wires, six connector wires, and so on. In general, the number of connector wires 220 may be an even number, as half of the connector wires 220 may be used to carry power and half of the connector wires 220 may be used to carry information. Thus, the number of connector wires 220 may be generally twice the number of telephone lines supported by a given telephone plug 120. Thus, if there are two connector wires 220, the telephone plug 120 may support one telephone line, if there are four connector wires 220, the telephone plug 120 may support two telephone lines, and so on. It may also be possible that a given telephone plug 120 may have more connections than actual connector wires 220. For example, telephone plug 120 may have four connections, but only use two connector wires 220. In such an embodiment, the telephone plug 120 may take on a shape that corresponds to a jack designed to support two lines, but only one line may actually be used. At a minimum, an embodiment may use two connector wires 220, one of which provides power and one of which conveys an analog phone signal. As discussed further below, a modem 414 converts digital data into an analog phone signal for transmission by the connector wires 220, and converts a received signal into a digital signal when receiving data.

As shown in FIG. 2, the connector wires 220 relay power and data between the hotspot 110 and telephone network 210. Power only moves in one direction. The power moves from the telephone network 210 into the hotspot. If there are multiple connector wires 220, multiple wires may share the load when providing power. Such power may normally be provided by the telephone network 210 to provide sufficient electrical energy to allow a telephone handset to operate. However, rather than using electrical power for this purpose, the hotspot 110 uses the power from the telephone network 210 to power its own operation. The hotspot 110 also acts as a conduit to allow other devices to connect to it to serve as an energy source. While such power may generally be provided using a wired connection, the hotspot 110 could also provide wireless charging. Such as wireless charging may conform with the Qi wireless charging standard.

As shown in FIG. 2, the connector wires 220 also relay data between the hotspot 110 and the telephone network 210. FIG. 2 shows that data may flow in both directions. Thus, generally, the hotspot 110 will generally provide a full duplex data connection with the telephone network 210. However, the telephone network 210 may only be capable of transmitting an analog telephone signal over the PSTN, as discussed above. The hotspot 110 may be configured to provide internet connectivity. Thus, the hotspot 110 uses a modem 414 with a dial-up connection, as discussed further below.

The hotspot 110 places a call over the PSTN to a telephone number provided by an Internet Service Provider (ISP). The modem 414 converts digital information to and from an analog audio signal that can be conveyed over the PSTN to the ISP. The modem 414 requires at least one connector wire 220, but may use multiple connector wires 220 to share the data. The ISP receives the audio signal at the other end, and uses its own modem to determine which information the hotspot 110 would like to send and receive over the Internet. FIG. 2 shows a full duplex connection in which data may be sent in both directions between the hotspot 110 and telephone network 210 through the connection of telephone plug 120 and telephone jack 130 over connector wires 220. However, other forms of connectivity may be possible. For example, the connection may also be a half-duplex connection. In a full duplex connection, outgoing and incoming data may be sent simultaneously. In a half-duplex connection, only one direction of data flow may occur at a given time. In other examples, the connection may only be an uplink connection, or only be a downlink connection.

Some embodiments may include provisions for a device that acts as an internet connectivity source. In some embodiments, the device may be an internet connectivity source that functions by providing a wireless internet hotspot. In some embodiments, the device may act as an internet connectivity source and may also act as a power source. In some cases, the internet connectivity and the power source may be provided as a wireless internet hotspot and a wireless power source. In some embodiments, the internet hotspot and power source may be provided as a wireless internet hotspot and a wireless power source. In some cases, the device provides the internet connectivity and the power by connecting to a network.

In some cases, such cases may be chosen to be a stable or resilient network. In some embodiments, the stable or resilient network may be a network that may be likely to remain functional after a disaster. In some cases, the stable or resilient network may be a telephone network. In some cases, such a telephone network may be the PSTN. The PSTN covers a wide area, and may be likely to remain operational even if power and internet coverage of other sorts may be disrupted. In some embodiments, the device may connect to the PSTN using a telephone plug that allows the sharing of power and data. In some cases, the device may use a Registered Jack (RJ) telephone plug. In some cases, the telephone plug may be an RJ11 telephone plug as this may be a type of telephone plug that may be commonly used to connect handsets and modems to a PSTN. The RJ11 telephone plug will use two contacts, one of which conveys power and one of which conveys data, as modulated into an audio signal.

Figure 3:
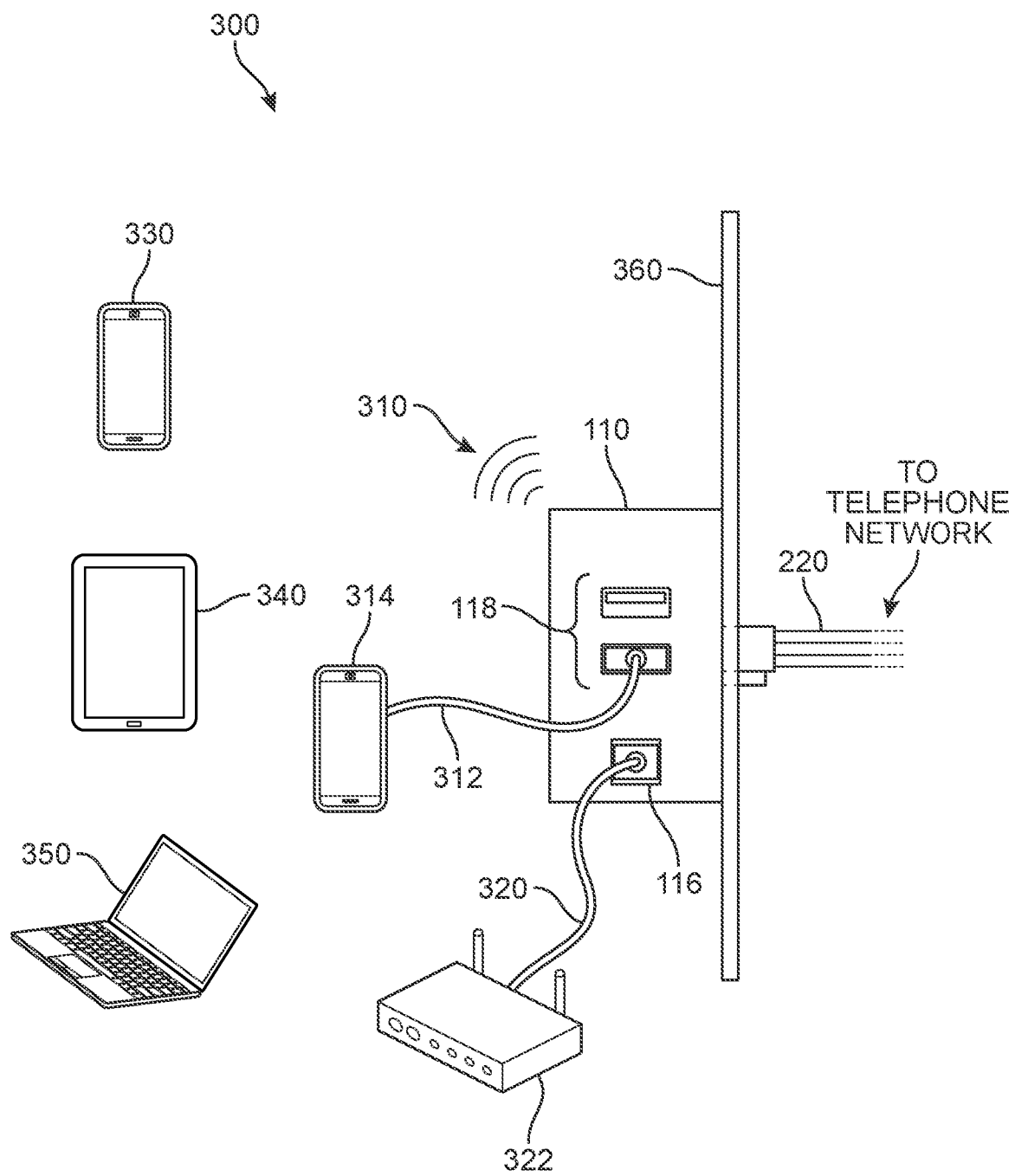
FIG. 3 is a schematic view of a telephone service powered hotspot providing internet access and electrical power supply to nearby devices, according to an embodiment.

FIG. 3 is a schematic view of a telephone service powered hotspot providing internet access and electrical power supply to nearby devices, according to an embodiment. In the schematic view 300 of FIG. 3, the hotspot 110 may be connected to a wall 360. Connector wires 220 connect the hotspot 110 to a telephone network, as shown in FIG. 2. The hotspot 110 provides power and internet connectivity for other devices in a nearby area. Such power and internet connectivity may be provided using wireless connectivity, wired connectivity, or a combination of wireless and wired connectivity. For example, hotspot 110 may provide wireless capabilities 310.

The wireless capabilities 310 may include wireless network access, wireless power, or a combination. For example, the wireless network access may use Wi-Fi, Bluetooth, NFC, ZigBee, or cellular network access to allow devices near the hotspot 110 to connect to the Internet. The wireless power may use a wireless power standard such as Qi wireless charging. The wireless charging may create a magnetic field into which devices can tap as a source of energy for charging. FIG. 3 shows some examples of various devices that may use the wireless capabilities 310 of hotspot 110. For example, FIG. 3 shows a smartphone 330, a tablet 340, and a laptop 350. Each of these devices may use all or some of the wireless capabilities 310 of hotspot 110. For example, smartphone 330 may use wireless charging and Wi-Fi internet connectivity provided by hotspot 110. Tablet 340 may use wireless charging telephone service powered hotspot 110. Laptop 350 may use Bluetooth to access internet connectivity provided by hotspot 110.

Hotspot 110 may also provide wired power and internet connectivity. For example, FIG. 3 shows that smartphone 314 and router 322 each have a wired connection to hotspot 110. Hotspot 110 is shown in FIG. 3 as having two wired connections, namely Ethernet port 116 and serial ports 118. Aspects of these ports are detailed in FIGS. 1 and 4. For example, smartphone 314 may be connected to serial ports 118 over cable 312. Serial ports 118 may act as a power source for smartphone 314. While serial ports 118 may be well-suited for acting as a power source for smartphone 314, the serial ports 118 may also convey data over cable 312 for smartphone 314. Alternatively, serial ports 118 could convey power for smartphone 314 and smartphone 314 could obtain its internet connectivity using the wireless capabilities 310 of hotspot 110.

As another example, router 322 could connect to Ethernet port 116 over cable 320. Such an Ethernet connection could provide internet connectivity for router 322. Thus, hotspot 110 provides internet connectivity for local devices using various forms of wired or wireless connectivity. Hotspot 110 may also be able to act as a power source. Alternatively, devices that interact with hotspot 110 may also have their own power sources, such as a battery or wall power from a power network (if a power network is still functioning).

Figure 4:
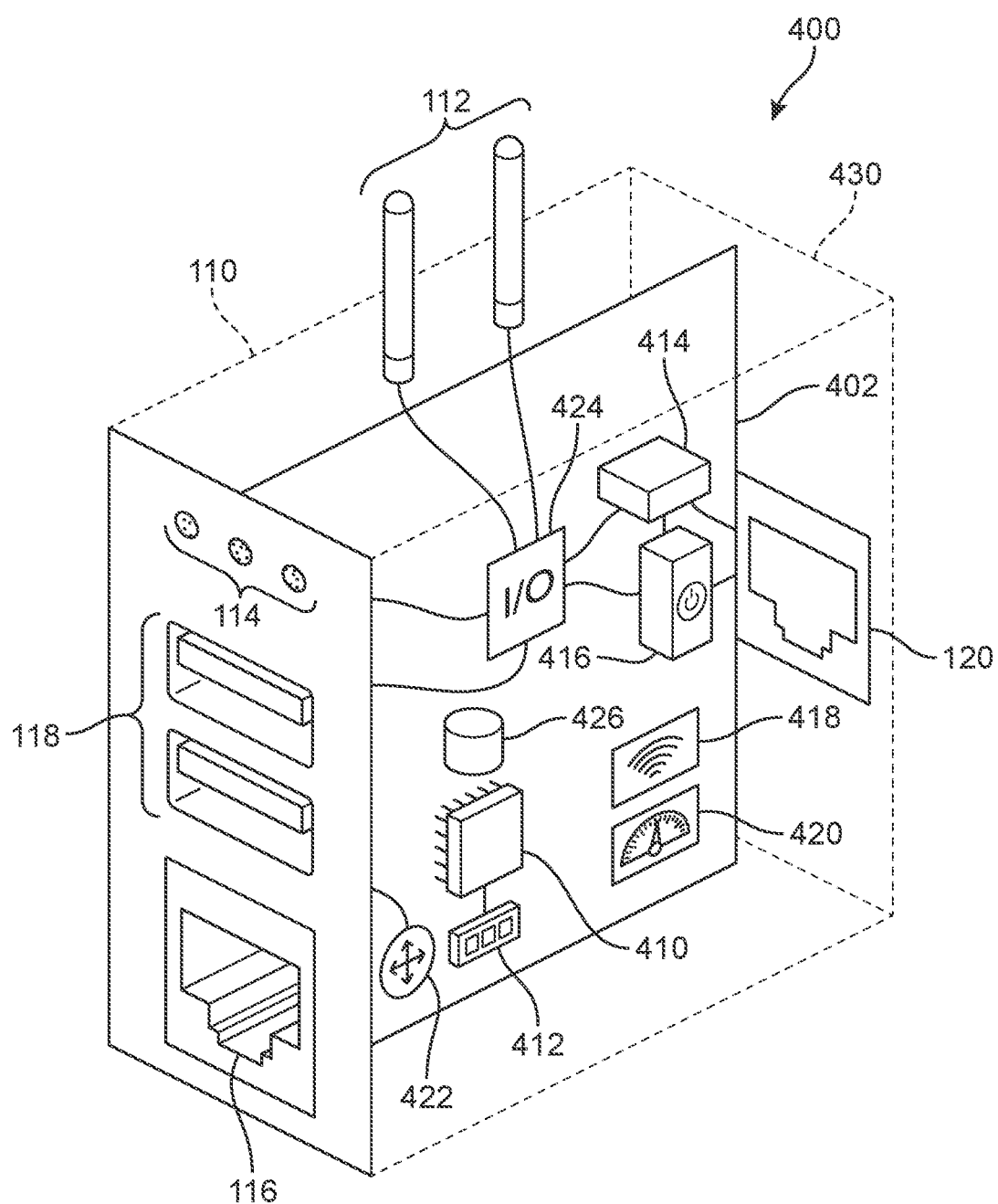
FIG. 4 is a schematic view of the interior architecture of a telephone service powered hotspot, according to an embodiment.

FIG. 4 is a schematic view of the interior architecture of a telephone service powered hotspot, according to an embodiment. The schematic view 400 illustrates a telephone service powered hotspot 110 that may be similar to the telephone service powered hotspot 110 illustrated in FIG. 1. However, certain external elements in the hotspot 110 of FIG. 4 may be located in different portions of the exterior of hotspot 110. Relocating these external elements does not have a meaningful effect on the operation of hotspot 110. Placing these external elements in this manner helps to illustrate the interior of hotspot 110. For example, hotspot 110 includes antennas 112, indicator lights 114, Ethernet port 116, and serial ports 118. These elements are in slightly different locations than in FIG. 1. Hotspot 110 is also shown as having telephone plug 120. Telephone plug 120 engages with telephone jack 130 as shown in FIG. 1, allowing power and data flow as shown in FIG. 2.

FIG. 4 includes a number of elements that allow hotspot 110 to provide its functionality. Specifically, FIG. 4 shows mainboard 402. Mainboard 402 may be a circuit board such as a motherboard or another circuit board to which electronic elements may be attached. Mainboard 402 includes, deployed on mainboard 402, a number of elements that provide the functionality of hotspot 110. FIG. 4 shows hotspot 110 as including a mainboard 402 with components situated on the mainboard 402. However, the components can be arranged in the hotspot 110 in other ways. For example, the components could be attached to edges of the case of hotspot 110.

For example, mainboard 402 includes processor 410 and memory 412. Processor 410 and memory 412 are illustrated as being connected to one another to share information. While processor 410 and memory 412 are each illustrated as being a single unit, processor 410 may include multiple processors or processors with multiple cores. Memory 412 may also take on different forms and may include multiple memory 412 elements.

Mainboard 402 may also include other units, such as modem 414, power supply 416, wireless network module 418, throttling module 420, wired networking module 422, input/output module 424, and data storage 426. Modem 414 is a computer hardware device that converts data from a digital format into a format suitable for an analog transmission. Such analog transmission causes the data to be suitable for transmission over a telephone connection. A modem 414 transmits data by modulating one or more carrier wave signals to encode digital information, while the receiver demodulates the signal to recreate the original digital information. The goal is to produce a signal that can be transmitted easily and decoded reliably. The modem 414 then performs the inverse operation of demodulation when receiving data form the telephone network. The modem 414 connects to telephone plug 120, and uses the connection to access the telephone network 210.

Power supply 416 is a unit that connects to telephone plug 120. In particular, power supply 416 is a unit that connects to a power connection of telephone plug 120. Power supply 416 thus receives a power supply from telephone network 210. It can distribute the power throughout the hotspot 110. For example, power supply 416 may supply power to elements such as modem 414 and input/output module 424. However, power supply 416 may also power other elements. Power supply 416 may power ports such as Ethernet port 116 and serial ports 118 so that these ports can provide power to external devices. Power supply 416 may also provide power to elements such as antennas 112, or similar elements that can create a magnetic field for providing a wireless power source.

Wireless network module 418 provides internet connectivity for hotspot 110. The hotspot 110 has internet access by virtue of the connection formed by modem 414. Wireless network module 418 creates a wireless network. Within the wireless network, devices communicate with hotspot 110 using a wireless connection and the hotspot 110 relays data to and from the Internet. Usually such a wireless hotspot is provided as a Wi-Fi hotspot. Other wireless technologies will also allow device in an area to communicate with a wireless network module 418 and then these devices will have internet access.

Throttling module 420 manages throttling. Dial-up internet has a very limited bandwidth. Thus, it may sometimes be necessary to throttle access by applications or devices if the available bandwidth is insufficient. Additional aspects of throttling are discussed with respect to FIG. 7. Wired networking module 422 provides hotspot 110 with the ability to provide a wired network connection. For example, wired networking module 422 may be connected to Ethernet port 116 or serial ports 118. When a device is connected by a cable to one of these ports, the wired networking module 422 manages network connectivity. Wired network module 422 may communicate with modem 414, and use modem 414 as a source of the internet connectivity it provides.

Input/output module 424 may be a module on mainboard 402 that may facilitate relaying power and data within hotspot 110. For example, input/output module 424 may connect modem 414 to antennas 112, indicator lights 114, Ethernet port 116, and serial ports 118. Input/output module 424 may also receive power from power supply 416 and help in the distribution of such power. Thus, input/output module 424 acts as a hub that interconnects the constituent parts of hotspot 110.

Data storage 426 may be a persistent memory that may be used to store information for the hotspot 110. For example, data storage 426 may allow persistent storage of certain settings of the hotspot 110. For example, data storage 426 may store information used to connect the hotspot 110 to an Internet Service Provider such as at least one telephone number used to form a connection, credentials, and connection settings. Data storage 426 may also store information about devices and applications that use the Internet as provided by hotspot 110, such as thresholds and priority information that can be used to allocate available bandwidth.

Hotspot 110 may take the form of a unified device that integrates hardware elements that provide communications capabilities and a power source by tapping into a telephone network. These hardware elements may be integrated into a chassis or case 430 that is sized and configured to provide a small, lightweight device that provides these resources using a single device. Various internal elements, as discussed above, are packaged within the chassis 430 and interact with one another to provide the features of the hotspot 110. The hotspot 110 also includes components such as antennas 112, indicators lights 114, Ethernet port 116, and serial ports 118, integrated into an exterior of the chassis 430 that facilitate wireless and wired connections and provide information to a user of the hotspot 110. The hotspot 110 also includes phone plug 120. The phone plug 120 protrudes from the chassis 430. When using the hotspot 110, a user introduces the phone plug 120 into a corresponding phone jack 130. In addition to conveying a phone signal and electrical power, the connection between the phone plug 120 and the phone jack 130 serves as a form of support for hotspot 110. The chassis 430 of hotspot 110 hangs from the point of attachment. Because hotspot 110 may be small and lightweight, the phone plug 120 may be strong enough to anchor hotspot 110 against the wall at the point of attachment to the phone jack 130.

Figure 5:
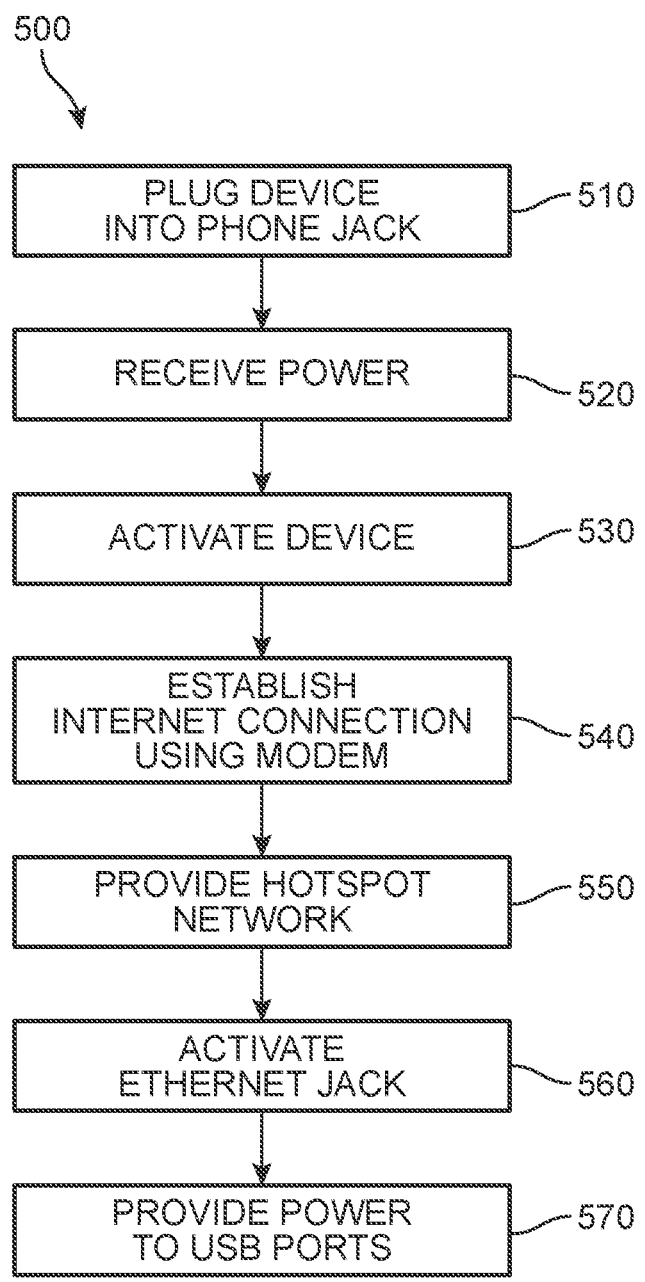
FIG. 5 is a flowchart of the activation of a telephone service powered hotspot, according to an embodiment.

FIG. 5 is a flowchart of the activation of a telephone service powered hotspot, according to an embodiment. The flowchart 500 provides for a method of using a hotspot 110, as discussed above. The method includes steps involved in physically installing hotspot 110 followed by steps that occur as various parts of hotspot 110 initialize. Starting at step 510, a user may plug a hotspot 110 into a telephone jack 130. Such a plugging may involve introducing telephone plug 120 into telephone jack 130.

As discussed above, the telephone plug 120 may include a latching mechanism that secures it inside telephone jack 130. Once the hotspot 110 may be introduced into the telephone jack 130, a series of steps occur to activate hotspot 110 so that it can provide functionality to nearby devices. In step 520, the hotspot 110 receives power from a telephone network 210, such as telephone network 210. The hotspot 110 may receive power over connector wires 220. For example, one of the connector wires 220 may a wire dedicated to providing power. For example, the PSTN may operate by providing a −48 Volt (V) Direct Current (DC) power source.

Originally, telephone systems were powered from a −48 VDC infrastructure out of their central office locations, −48 VDC may be used because it provides enough in power to support a signal, but not enough to be dangerous. It may be generally accepted by safety regulations and electrical code that anything operating at or below 50V DC may be a safe low-voltage circuit. Thus, −48 VDC may still be used as the standard for providing power in communications facilities serving up both wired and wireless services.

In fact, −48 VDC allows telecom operators to use 12-volt lead-acid batteries wired in series to act as a backup power source in the event of a power failure. Negative 48 VDC (−48 V), being positive grounded, was selected for use in the PSTN when it was found to be superior to positive voltage. It prevents electrochemical reactions from destroying buried copper cables and rendering them useless if they happen to get wet. Negative voltage also protects against sulfation on battery terminals.

The central office (CO) and wireless switches may be run by a combination of AC powered rectifiers and batteries. The batteries may be rated at 48 V DC and the rectifiers may supply 52 V DC. The rectifiers keep the batteries charged and power the CO equipment while the electric company power flows. If the power fails, the batteries, which may be "floating" seamlessly take over the load. The communications equipment does not notice the difference, and everything keeps operating. When the power comes back, the rectifiers take over again and continue operating. In some ways, the entire facility may be a large uninterruptible power supply.

Most of the data passing through this hardware may be considered to be mission critical in nature, and there may be little room for failure. The last stop for power before going into the power supplies of the mission critical hardware may be a DC power distribution block or some form of power distribution unit (PDU). It provides the outlets or terminals necessary for powering the network hardware. This PDU may be the best place to monitor power consumption and provide remote power control.

In step 530, the system activates the hotspot 110. The hotspot 110 detects power, and powers on. Then, in step 540 the hotspot 110 establishes an internet connection using a modem. Greater details of step 540 are discussed with respect to FIG. 6. Once step 540 may be complete and the hotspot 110 may be connected to the Internet, the hotspot 110 provides a hotspot network in step 550. Such a hotspot network may be a Wi-Fi network or another type of wireless network. Devices in the hotspot network can communicate with hotspot 110, which provides internet access wirelessly for these devices.

In step 560, hotspot 110 activates an Ethernet jack. Such an Ethernet jack may provide wired internet. While Ethernet may usually be used to convey data, the Ethernet jack may also provide a wired power source. In step 570, hotspot 110 provides power to USB ports (or other serial ports). While USB ports are usually used to provide power, the USB ports may also provide wired internet.

Some embodiments may include provisions for using a device to provide internet connectivity and power. In some embodiments, such internet connectivity and power may be provided by using the device to connect to a PSTN and using connections with the PSTN to provide the internet access and the power. In some cases, the device provides internet connectivity. In some embodiments, the device provides internet connectivity using a wired connection. In some cases, the wired internet connectivity may be provided through an Ethernet connection. In some embodiments, the wired internet connectivity may be provided through a serial connection, such as a USB connection. In some cases, the USB connection may be a USB-A port. In some embodiments, the USB connection may be a USB-C port.

In some cases, the device provides internet connectivity using a wireless connection. In some embodiments, the device provides a wireless connection for internet connectivity using Wi-Fi. In some cases the device provides a wireless connection for internet connectivity using another protocol such as Bluetooth, ZigBee, NFC or a form of cellular communication. In some embodiments, the device provides a power source. In some cases, the device provides wireless power. In some embodiments, the device complies with the Qi standard for wireless power. In some cases, the device provides power through a wired connection. In some embodiments, the device provides power through an Ethernet connection. In some cases, the device provides power through a USB port. In some embodiments, the USB connection may be a USB-A port. In some cases, the USB connection may be a USB-C port.

Figure 6:
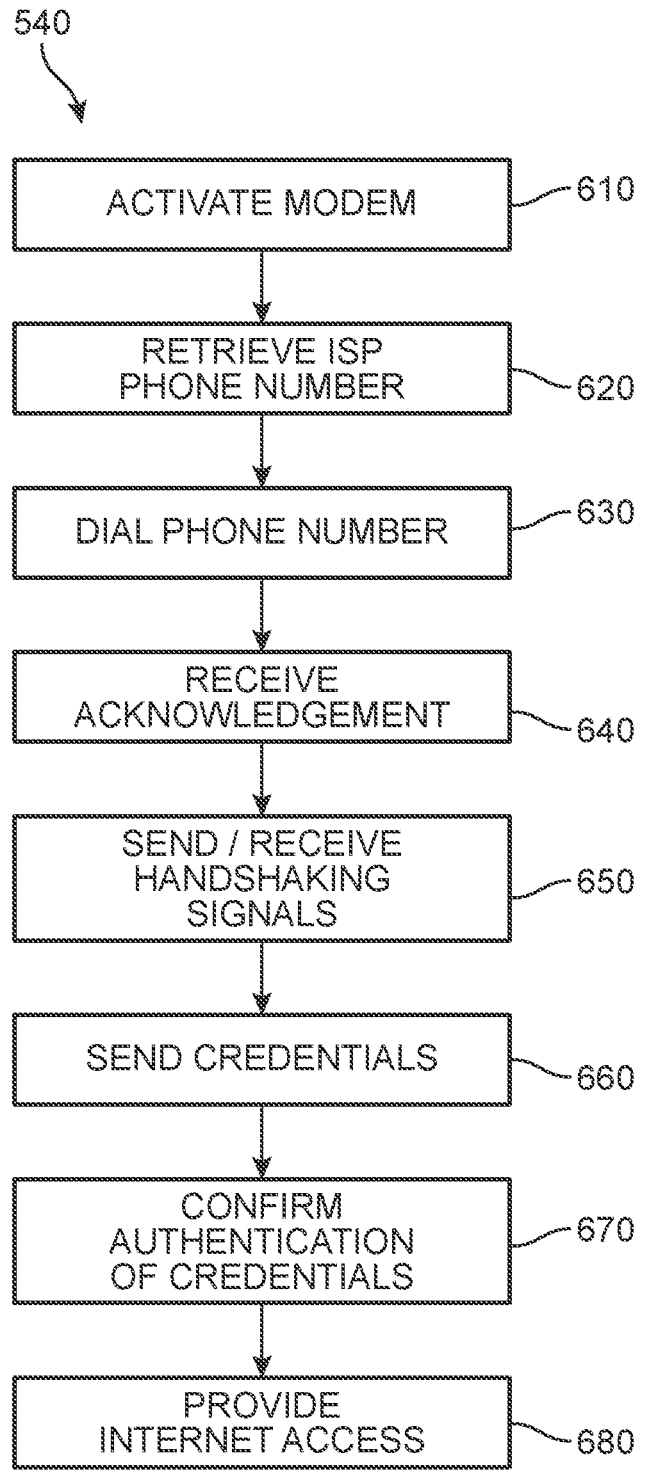
FIG. 6 is a flowchart of the details of establishing an internet connection using a dial-up modem, according to an embodiment.

FIG. 6 is a flowchart of the details of establishing an internet connection using a dial-up modem, according to an embodiment. The flowchart 540 provides for greater details of step 540 of the method 500 presented in FIG. 5. In step 610, the method activates a modem 414. As noted, the modem 414 is the device that modulates and demodulates digital data so it can be sent and received in analog form over a telephone line. When the modem 414 activates, it attempts to form a dial-up internet connection. In step 620, the modem 414 determines an ISP's telephone number. For example, such a telephone number may be stored by the hotspot 110 at data storage 426. The hotspot 110 may store several telephone numbers. If one telephone number does not work, there may alternatives. Also, the phone numbers may be chosen to be local or toll-free numbers to minimize long-distance phone call charges.

In step 630, the modem 414 dials the telephone number using its connection to the telephone network 210. In step 640, the modem 414 receives an acknowledgement from the telephone network 210. In step 650, the modem 414 sends and receives handshaking signals. These signals are signals that allow the modem 414 and the telephone network 210 to establish characteristics of the connection. For example, the handshaking signals may provide that the modem 414 is to use data compression to boost performance. In step 660, the method sends credentials. Such credentials may include at least one of a username, a password, and another credential such as an electronic key that can be used to establish a connection. In step 670, the method confirms authentication of credentials. At this point, modem 414 may be in communication with telephone network 210. In step 680, the method provides internet access. Such provided internet access may then be used as described in FIG. 5.

Some embodiments may include provisions for establishing a network connection for the hotspot. In some embodiments, the network connection for the hotspot connects the hotspot to the Internet. In some cases, the hotspot connects to the Internet using a reliable and disaster resistant connection. In some embodiments, the hotspot connects to the Internet using the PSTN. In some cases, the internet connection for the hotspot may be established using a modem. In some cases, the modem may establish an internet connection by using a dial-up connection with an ISP. In some embodiments, the modem may call a designated telephone number for the ISP. In some cases, the telephone number may be a toll-free number or a number that may be chosen to be a local call for the calling location of the hotspot.

In some embodiments, the modem may connect to the ISP by providing credentials. In some cases, the credentials may include at least one of a username, a password, and some form of electronic key or other authentication. In some embodiments, the modem establishes the internet connection by using a handshaking process. In some cases, the handshaking process may involve sending information between the modem and the ISP to establish parameters and initiate an internet connection. In some embodiments, the performance of the connection may be improved by using data compression.

Figure 7:
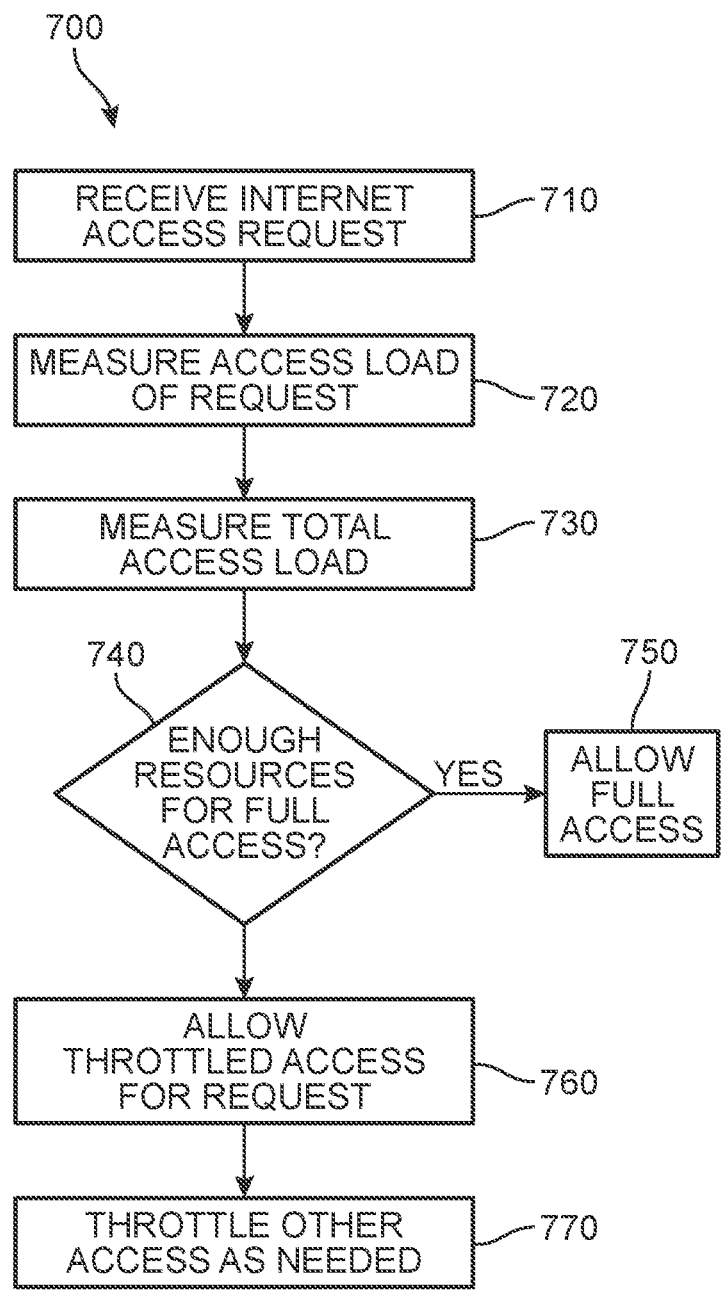
FIG. 7 is a flowchart of throttling communication provided by the telephone service powered hotspot, according to an embodiment.

FIG. 7 is a flowchart of throttling communication provided by the telephone service powered hotspot, according to an embodiment. The flowchart 700 shows a method that throttles internet connectivity. When the hotspot provides internet connectivity, it does so by using a dial-up connection. Dial-up internet connections may be limited to a bandwidth of 56 kbps. It may be possible to improve the bandwidth somewhat by using a dial-up connection with data compression. For example, in step 710, the method receives an internet access request. Such a request may be a generalized request from a device for a certain amount of internet access. The request may also be specific request from an application. For example, a web browser may send a request to stream a song or a video.

In step 720, the method measures an access load of the request. The access load may be associated with an amount of data to be transmitted and a time requirement for the transmission. Some data requests are synchronous and some are asynchronous. Synchronous and asynchronous requests may be handed differently. Asynchronous requests may be able to accommodate more delay or more uneven bandwidth than synchronous requests.

Different requests may be associated In step 730, the method measures a total access load. In step 740, the method determines if there may be enough available resources to allow the requesting device to have full internet access. If there may be enough resources, the method provides full access in step 750. If there may not be enough resources for full access, the method may allow throttled access for the request in step 760. The method may also throttle other access as appropriate in step 770. For example, the throttling may prioritize synchronous requests over asynchronous requests, or vice versa.

The throttling may also be based on priorities associated with certain requests. For example, requests from an emergency responder may be prioritized over those of an end-user. The throttling may also attempt to provide full data services for requests with low data usage. The throttling may automatically throttle requests with high data usage. Data usage may be classified as low or high by comparing it to a threshold. For example, requests that consume less than a certain amount of bandwidth may always be provided with full resources (if possible) and requests that consume more than a certain amount of bandwidth may always be throttled (unless there is enough bandwidth to satisfy the request without throttling any other requests). When throttling, a bandwidth modification may change the way in which a request is fulfilled. For example, a graphical web browser may be throttled by using a textual web browser, and a video request may be throttled by providing low quality video or downloading the video asynchronously prior to playback.

Some embodiments may include provisions for managing data speed based on an application when providing internet access. In some embodiments, internet access for an application may be managed based on measured resources used for the application. In some cases, the measured resources may include an amount of bandwidth used by application. The hotspot may only have access to a certain amount of data bandwidth because it uses a dial-up connection. As discussed, dial-up connections have a limited bandwidth. In some cases, an application may use a certain amount of bandwidth. In some embodiments, an application may use a certain amount of uplink bandwidth and a different amount of downlink bandwidth.

In some cases, the hotspot may manage data speed for an application based on available resources. In some embodiments, the hotspot may manage data speed by determining how to divide bandwidth between multiple devices and applications that use bandwidth to operate. In some cases, multiple devices and applications may be associated with various priority settings and these priority settings may be used to help determine how to allocate limited bandwidth among multiple devices and applications.

In some embodiments, an application may have high bandwidth allotments. In some cases, if only limited bandwidth may be available, the application with high bandwidth allotments may be throttled. In some embodiments, an application may have low bandwidth allotments. In some cases, because the application has low bandwidth allotments, the application may be provided with full access to the data resources it requests. Thus, applications are throttled in a way that may prioritize applications with certain characteristics that may indicate that allocating bandwidth to the applications will lead to desirable results, such as a more effective opportunity to respond after a disaster.

Thus, the hotspot 110 provides for an advantageous device that can use a telephone network, such as the Public Switched Telephone Network (PSTN) to provide a source of backup internet connectivity and power when other internet and power sources may be disabled. For example, after a disaster, the PSTN may still be functional. A user plugs the hotspot 110 into a telephone jack 130 of the PSTN. The hotspot 110 activates, and receives power from the PSTN. The hotspot 110 then uses a modem to create a dial-up internet connection with the PSTN. The power received by the hotspot 110 from the PSTN and the dial-up internet connection allow the hotspot 110 to provide wired and wireless power and internet access for nearby mobile devices.

These capabilities allow devices to access power and internet connectivity, even if a power grid or other sources of internet connectivity do not function due to a disaster. Additionally, a dial-up internet connection may have a significantly lower bandwidth than a broadband internet connection it replaces. Accordingly, the hotspot 110 may provide all of the data requested by an application with low bandwidth allotments, such as an e-mail client or a textual web browser. However, the hotspot 110 may throttle data for an application with high bandwidth allotments, such as a graphical web browser or a streaming video application. The telephone service powered hotspot 110 hotspot 110 may also coordinate dividing available bandwidth between multiple devices and multiple applications. Such device and applications may be associated with different bandwidth allotments and different priorities.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular telephones, smartphones, tablet computers, notebook computers, e-book readers, laptop or desktop computers, all-in-one computers, as well as various kinds of digital media players.

The processes and methods of the embodiments can be stored as instructions and/or data on non-transitory computer-readable media. Examples of media that can be used for storage include erasable programmable read-only memory (EPROM), electrically erasable programmable read-only memories (EEPROM), solid state drives, magnetic disks or tapes, optical disks, CD ROM disks and DVD-ROM disks.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

For each of the exemplary processes described above including multiple steps, it may be understood that other embodiments some steps may be omitted and/or reordered. In some other embodiments, additional steps could also be possible.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A communication device, comprising:
a modem configured to provide a dial-up internet connection;
a telephone plug configured to connect the communication device to a telephone jack of a telephone network;
wherein the telephone plug includes at least one electrical contact configured to receive electrical power from the telephone network;
wherein the telephone plug includes at least one electrical contact configured to connect the modem to the telephone network; and
wherein the modem connects to the telephone network and provides an internet connection by using the telephone network as a source of dial-up internet access; and
a wireless networking module configured to provide wireless internet access to an area near the communication device via the internet connection using Wi-Fi;
wherein the modem and the wireless networking module are packaged within a chassis that is sized and configured such that the communication device is small and lightweight, the telephone plug protrudes from the chassis, and at least one antenna protrudes from the chassis.

2. The communication device of claim 1, further comprising an Ethernet port configured to provide wired internet access to a device connected to the Ethernet port using the internet connection; and further comprising a power supply that receives the electrical power from the telephone network and provides wireless charging for a device proximate to the communication device using the Qi wireless charging standard.

3. The communication device of claim 1, further comprising a Universal Serial Bus port configured to provide wired internet access to a device connected to the Universal Serial Bus port using the internet connection.

4. The communication device of claim 1, wherein the modem provides dial-up internet access by communicating with an Internet Service Provider over the telephone network.

5. The communication device of claim 4, wherein the modem connects to the Internet Service Provider over the telephone network by calling a designated telephone number for the Internet Service Provider, sending and receiving handshake signals, and sending credentials to the Internet Service Provider upon being plugged into the telephone jack.

6. The communication device of claim 1, wherein the modem and the wireless networking module are packaged within the chassis and the telephone plug protrudes from the chassis in such a manner as to reversible attach to the telephone jack using a latching tab on the telephone plug.

7. The communication device of claim 1, wherein the telephone plug is an RJ11 plug.

8. A communication device, comprising:
a modem configured to provide a dial-up internet connection;
a telephone plug configured to connect the communication device to a telephone jack of a telephone network;
wherein the telephone plug includes at least one electrical contact configured to receive electrical power from the telephone network;
wherein the telephone plug includes at least one electrical contact configured to connect the modem to the telephone network;
wherein the modem connects to the telephone network and provides an internet connection by using the telephone network as a source of dial-up internet access;
a wireless networking module configured to provide wireless internet access to an area near the communication device via the internet connection using Wi-Fi;
a power supply configured to receive the electrical power from the telephone network through the telephone plug; and
a port configured to send the electrical power from the power supply to a connected device;
wherein the communication device further provides wireless charging for a device proximate to the communication device using the Qi wireless charging standard;
wherein the modem, the wireless networking module, and power supply are packaged within a chassis that is sized and configured such that the communication device is small and lightweight, the telephone plug protrudes from the chassis, and at least one antenna protrudes from the chassis.

9. The communication device of claim 8, wherein the port is an Ethernet port and the Ethernet port also provides wired internet connectivity to the connected device using the internet connection.

10. The communication device of claim 8, wherein the port is a Universal Serial Bus port and the Universal Serial Bus port also provides wired internet connectivity to the connected device using the internet connection.

11. The communication device of claim 8, wherein the modem uses data compression to improve a speed of the internet connection.

12. The communication device of claim 8, wherein the modem sends credentials to an Internet Service Provider when connecting to the telephone network.

13. The communication device of claim 8, wherein the wherein the modem connects to an Internet Service Provider over the telephone network by calling a designated telephone number for the Internet Service Provider, sending and receiving handshake signals, and sending credentials to the Internet Service Provider upon being plugged into the telephone jack.

14. The communication device of claim 8, wherein the power supply provides power to allow the modem to operate.

15. A communication device, comprising:
   a modem configured to provide a dial-up internet connection;
   a telephone plug configured to connect the communication device to a telephone jack of a telephone network;
   wherein the telephone plug includes at least one electrical contact configured to receive electrical power from the telephone network;
   wherein the telephone plug includes at least one electrical contact configured to connect the modem to the telephone network;
   wherein the modem connects to the telephone network and provides an internet connection by using the telephone network as a source of dial-up internet access;
   a wireless networking module configured to provide wireless internet access to applications executed on user devices near the communication device the internet connection using Wi-Fi; and
   a throttling module configured to allocate bandwidth for the internet connection to the applications using the internet connection, wherein the throttling module is configured to allocate bandwidth to requests from an emergency responder over requests from a non-emergency responder end-user;
   wherein the modem, the wireless networking module, and the throttling module are packaged within a chassis that is sized and configured such that the communication device is small and lightweight, the telephone plug protrudes from the chassis, and at least one antenna protrudes from the chassis.

16. The communication device of claim 15, wherein the throttling module allocates a full requested bandwidth for an application with low bandwidth requirements.

17. The communication device of claim 16, wherein the application with low bandwidth requirements is an application transmitting information asynchronously.

18. The communication device of claim 15, wherein the throttling module allocates a throttled bandwidth for an application with high bandwidth requirements.

19. The communication device of claim 18, wherein the application with high bandwidth requirements is an application transmitting information synchronously.

20. The communication device of claim 15, wherein each application is associated with a priority and the throttling module allocates bandwidth based on the priorities of the applications.

* * * * *